United States Patent [19]

Ishii et al.

[11] Patent Number: 4,967,228
[45] Date of Patent: Oct. 30, 1990

[54] METHOD OF PHOTOGRAPHING ON MICROFILM AND APPARATUS THEREFOR

[75] Inventors: Kenjiro Ishii; Fumio Fukumoto; Koichi Nagata, all of Osaka; Akira Shibata, Tokyo, all of Japan

[73] Assignee: Minolta Camera Kabushiki Kaisha, Osaka, Japan

[21] Appl. No.: 334,906

[22] Filed: Apr. 6, 1989

[30] Foreign Application Priority Data

Apr. 6, 1988 [JP] Japan .................................. 63-83095

[51] Int. Cl.$^5$ ............................................ G03B 27/52
[52] U.S. Cl. ......................................... 355/40; 355/41; 355/54
[58] Field of Search ....................... 355/39, 40, 41, 54, 355/64, 43, 45, 77

[56] References Cited

U.S. PATENT DOCUMENTS

3,827,802 8/1974 Pfeifer et al. ......................... 355/41
4,701,046 10/1987 Shiga ................................ 355/40 X
4,803,505 2/1989 Saijo et al. ......................... 355/64 X Primary Examiner—L. T. Hix
Assistant Examiner—D. Rutledge
Attorney, Agent, or Firm—Price, Gess & Ubell

[57] ABSTRACT

A method and apparatus for additionally photographing information for retrieval during the photographing of an original image on a microfilm is disclosed. A slit light from a light source is projected on the microfilm while the microfilm is being transported. The length of the information for retrieval to be additionally photographed on the microfilm can be freely set by controlling the period of the projection of the light on the microfilm. One displaying device is adapted to project light in the pattern of one numeral on the microfilm while the microfilm is at rest.

13 Claims, 7 Drawing Sheets

METHOD OF PHOTOGRAPHING ON MICROFILM AND APPARATUS THEREFOR

BACKGROUND OF THE INVENTION

1. Field of the Invention:

This invention relates to a method for photographing original images recorded on a document of varying form and additional information relevant thereto on a microfilm and an apparatus used therefor.

2. Description of the related Art:

On microfilm on which original images recorded in a document of varying nature are photographed, information of a varying sort that is useful for retrieval of the photographed images is additionally photographed for the purpose of facilitating management and retrieval of the photographed images. As the additional information for retrieval are counted document marks otherwise called blip marks are well known, which marks are used for counting image frames and, at the same time, discerning image sizes. As another sort of information for retrieval, a series of frame numbers representing serial numbers assigned to the individual images are photographed on the microfilm.

As method of additionally photographing such information for retrieval as mentioned above on the film, known methods include one which comprises forming on a document stand a display part for displaying the information for retrieval in a position within the coverage of microfilm (field of view of the camera) on the document stand and allowing the additional information for retrieval to be photographed on the microfilm simultaneously with the original image from the document and another which comprises incorporating such a display part in the camera head thereby permitting simultaneous photographing of the original image and the relevant information for retrieval on the microfilm.

Figure 10:
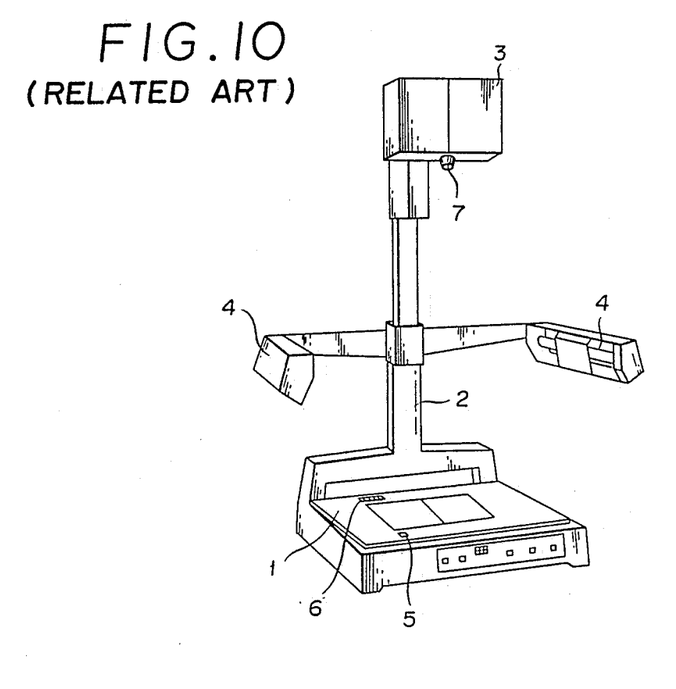
FIG. 10 is a perspective view illustrating the conventional camera for photographing on a microfilm.

FIG. 10 is a diagram illustrating a microfilm camera which embodies the former method. This camera comprises a base table 1 for supporting a document, a supporting pole 2 fixed on the base table 1, a camera head 3 attached to the supporting pole 2 and adapted to photograph an original image recorded on the document on a microfilm, and illuminators 4 for illuminating the base table 1. On the base table 1, a display part 5 for displaying the document marks mentioned above and a display part 6 for displaying the frame numbers mentioned above are so disposed in the proximity of the document as to be located within the field of view of a lens 7 attached to the camera head 3. A microfilm camera embodying the latter method is disclosed in U.S.P. No 4,701,046, for example.

When the display part for photographing the information for retrieval is installed on the base table as described above, the exposure time is varied by the contrast among the original images recorded on the document and the images of information for retrieval are consequently photographed in inconsistent density. This inconsistency of density not only prevents the photographed microfilm from acquiring fine quality but also constitutes itself a possible cause for an erroneous operation during the course of retrieval in an extreme case. When the ratio of magnification of the optical system is varied by the size of document or the size of film, the size of the images of information photographed on the microfilm is consequently varied. To avoid this drawback the size of numerals and other similar figures on the display part used in representing the information for retrieval must be varied proportionately to the ratio of magnification.

When the photographing of the information for retrieval is to be effected within the camera head as described above, an idea of enabling the original images of the document to be photographed simultaneously with the information for retrieval is not easily materialized because the head interior has a limited space. The solution of this difficulty has no alternative but to rely on a method which comprises first photographing an original image of the document, then advancing the microfilm to the next frame, and thereafter photographing the information for retrieval of the photographed image. In this method, however, when the original images recorded on the document have a plurality of sizes such as single size and double size, for example, the amounts of advance of the microfilm are varied with the sizes of original images. Thus, the positions of the microfilm at which the images of information for retrieval are photographed on the microfilm must be changed by the sizes of original images.

Further, in the case of the conventional microfilm camera disclosed in the U.S. Pat. specification, the photographing of a document mark among the information for retrieval is effected by selectively spotting light upon a display part bearing the numeral corresponding to the kind of mark to be photographed and the photographing of the relevant frame number is attained by a display part bearing the numeral corresponding to the largest number of digits of the numeral mentioned above. In other words, the information for retrieval is simultaneously photographed on the microfilm, with the document mark in a prescribed width and the numeral in a prescribed numer of digits. The display part used therefor is relatively large and, as the result, the optical system for photographing the information for retrieval is proportionately large. As a consequence, the cost of the entire system is inevitably increased and the camera head unduly gains in size and complexity.

SUMMARY OF THE INVENTION

An object of this invention is to provide a method for photographing on a microfilm, which permits the photographing of original images recorded on a document and the photographing of information for retrieval to be carried out within a compact camera head and an apparatus for working the method.

Another object of this invention is to provide a method for photographing on a microfilm, which, by means of a light source adapted to project a slit of light of narrow width on the microfilm while the microfilm is in motion, allows the photographing of information for retrieval of any desired width on the microfilm and an apparatus for working this method.

Yet another object of this invention is to provide a method for photographing on a microfilm, which, by means of a display device adapted to project one letter or numeral on the microfilm while the microfilm is kept at rest, enables a piece of information for retrieval consisting of a multiplicity of letters and numerals to be photographed simultaneously with one original image exclusively by the display device by advancing the microfilm while the display device is keep OFF and keeping the displayed device ON while the microfilm is at rest and an apparatus for working this method.

In accordance with one aspect of the present invention, there is provided a micro-image photographing camera for photographing original images and additional information on a film, which comprises: photographing means for photographing an original image on the film; additional image generating means including a light source and optical means for projecting light from the light source on the film; transporting means for transporting the film; and control means for controlling the operating period of the projecting means during the transportation of the film by the transporting means thereby allowing the formation of the additional information of a varying size on the film.

In accordance with another aspect of the present invention, there is provided a method for photographing a micro-image and an additional image on a film, comprising the steps of: photographing an original image on the film; projecting light from the light source on the film; transporting the film while the light source is emitting light; and controlling the period of emission of light from the light source during the transportation of the film thereby allowing the formation of the additional information in various sizes on the film.

In the present invention, with the light from the light source which emit light exclusively in the smallest unit width, a mark of a desired width can be additionally photographed as information for retrieval. Further, with the display device adapted to project light in the form of one letter or numeral, a plurality of letters and numerals corresponding to one original image may be photographed. As a result, this invention has provided a compact camera head incorporating therein a display part for additionally photographic information for retrieval.

DESCRIPTION OF THE PREFERRED EMBODIMENTS

Now, the present invention will be described more specifically below with reference to one embodiment of this invention illustrated in the accompanying drawings.

Figure 1:
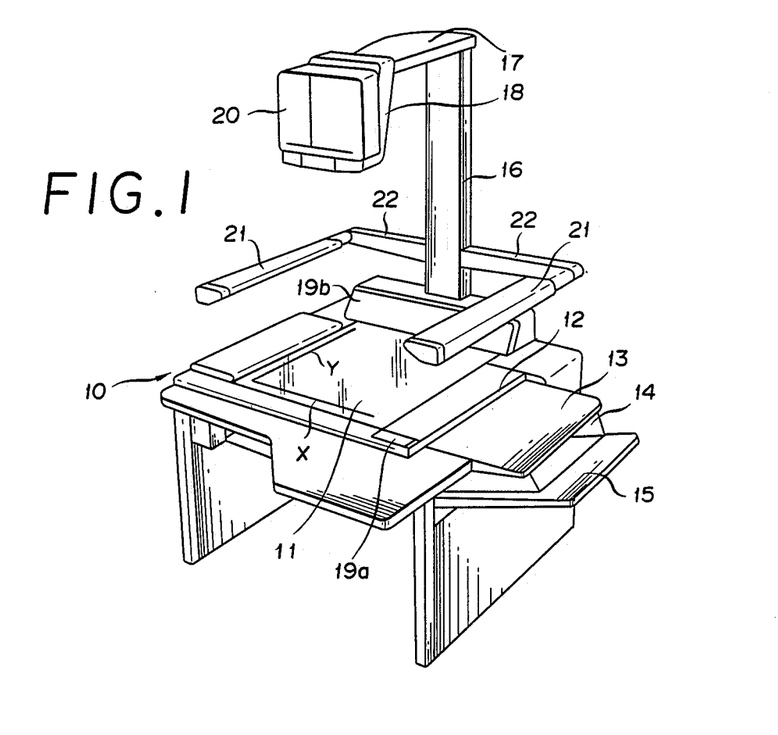
FIG. 1 is a perspective view wholly illustrating a microfilm photographing apparatus of this invention.

A base table 10 serving as a document stand is provided, as illustrated in FIG. 1, with a document retainer glass 11. A document conveying device (not shown is set in place under this glass 11. A document in the form of a sheet is advanced along the lower side of the glass 11. A document insertion inlet 12 is formed in the upper righthand part of the base table 10. Documents mounted on a supporting stand 13 installed as juxtaposed to the insertion inlet 12 are manually fed in one by one through the insertion inlet 12 and conveyed to the lower side of the glass 11 by the document conveying device. Below the insertion inlet 12 is disposed a supporting stand 15 provided with an automatic document insertion hole 14. This supporting stand 15 allows sheet-like documents piled up therein to be automatically conveyed one after another along the lower side of the glass 11. Optionally, a document may be directly spread on the glass 11 to have an original image recorded thereon to be photographed.

At the center in the rear part of this base table 10, a supporting pole 16 is erected. To this supporting pole 16, a holder 18 is attached through the medium of a beam 17 fixed to the leading end of the supporting pole 16. To this holder 18 is attached a camera head 20. The base table 10 is provided in the front part and the rear part thereof respectively with operating panels 19a, 19b.

Each of the documents manually inserted one by one through the insertion inlet 12 and conveyed by the document conveying device to the position below the glass 11 or each of the documents piled up on the supporting stand 15 and conveyed one after another by the conveying device through the inesrtion inlet 14 to the position below the glass 11 is set in place so that the corner thereof conforms exactly with the position indicated by the symbols X and Y in FIG. 1. As a result, a so-called corner registration of a document is accomplished. This corner registration holds good even when the document is directly spread on the glass 11. The document is photographed as held in such a position that the corner thereof is correctly aligned with that between the reference lines X and Y. The camera head 20 is adapted to be shifted, in conjunction with the holder 18, back and forth and right and left, namely to be moved vertically toward the corner, depending on the size of the document positioned as described above, so that the original image recorded on the document may be wholly photographed.

To the supporting pole 16 is attached an arm 22 which is provided at the opposite terminals thereof one each with illuminators 21 each incorporating therein a light source. These illuminators 21 are adapted so that the beams of light emitted therefrom will impinge on the glass 11.

Figure 2:
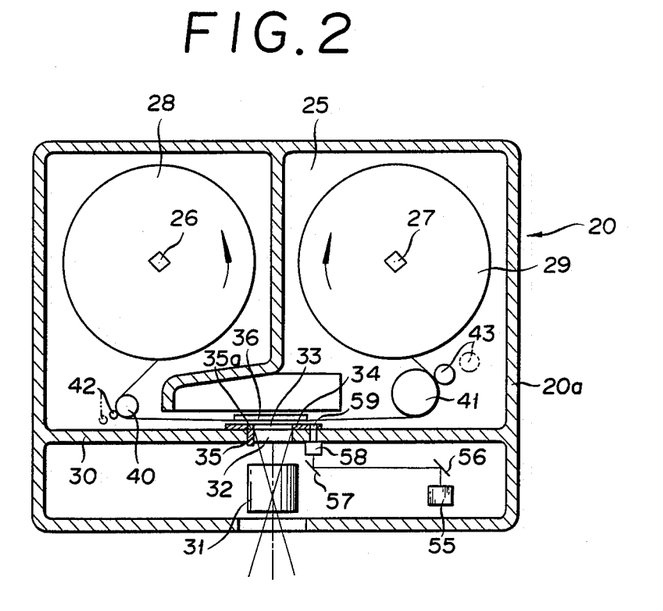
FIG. 2 is a cross section illustrating the interior of a camera head shown in FIG. 1.

FIG. 2 is a diagram illustrating a film feeding device incorporated in the camera head 20 shown in FIG. 1. A film chamber 25 is formed inside the camera head 20. This film chamber 25 is provided projectingly therein with a feed shaft 26 and a take up shaft 27. The feed shaft 26 is adapted so that a supply reel 28 will be fitted thereon and the takeup shaft 27 is adapted so that a takeup reel 29 will be fitted thereon.

In a partition wall 30 of a case 20a forming the camera head 20, an opening 32 is formed to permit passage of the light penetrating through a lens 31 attached to the camera head 20. To the inner surface of the partition wall 30 is attached a stationary plate 34 which has an opening 33 formed therein at the position aligning with the opening 32 mentioned above. In the stationary plate 34, a movable plate or an aperture switching plate 35 is disposed switchably about an axis 35a. By the switching of this movable plate 35, the area of the aperture formed by the opening 33 will be changed between large and small sizes. When the document to be photographed has a small size such as A4, for example, the movable plate 35 is closed to set the area of the aperture to half size. When an image of the document having a large size of A3 is to be photographed at the same ratio of reduction, the movable plate 35 is opened to set the area of the aperture formed by the opening 33 to the same full size as the opening 32 mentioned above.

The camera head 20 is provided therein with a pressing plate 36 which is adapted to urge the microfilm F being played out of the supply reel 28 and wound on the takeup reel 29 closely toward the stationary plate 34 and the movable plate 35. For the microfilm F to be guided beneath the pressing plate 36, a guide roller 40 is rotatably disposed below the supply reel 28. Further, for the purpose of regulating the position of movement of the microfilm F which has passed the guide roller 40 and, at the same time, conveying the microfilm F forward, a metallic feed roller 41 is disposed below the takeup reel 29. The feed roller 41 is interlocked with a stepping motor 37 (refer to FIG. 5) which is driven as controlled with pulses of electric current. The rotation imparted by this stepping motor 37 to the feed roller 41 fixes the amount of conveyance of the film F.

To permit fast contact of the film F with the guide roller 40, a guide roller 42 is installed in a position juxtaposed to the guide roller 40. Then, to permit fast contact of the film F with the feed roller 41, another guide roller 43 is installed as juxtaposed to the feed roller 41. To facilitate the work of mounting the microfilm F in the camera head 20, the guide roller 42 is adapted to make and break contact readily with the guide roller 40. When the guide roller 42 breaks contact with and departs from the guide roller 40, it assumes the position indicated by an imaginary line in FIG. 2. Similarly, the guide roller 43 is enabled to make and break contact with the adjacent feed roller 41. The state which the guide roller 43 assumes after breaking this contact is indicated by an imaginary line similarly.

The conveyance of the film F is effected by the rotation of the feed roller 41 as described above. For the film F to be played out from between the feed roller 41 and the guide roller 43 to be infallibly wound on the takeup reel 29, a slight torque is exerted upon the takeup reel 29 in the rotational direction indicated by the arrow. To prevent the film F paid out of the supply reel 28 from sagging, a weak braking or frictional force is exerted on the supply reel 28.

Figure 4:
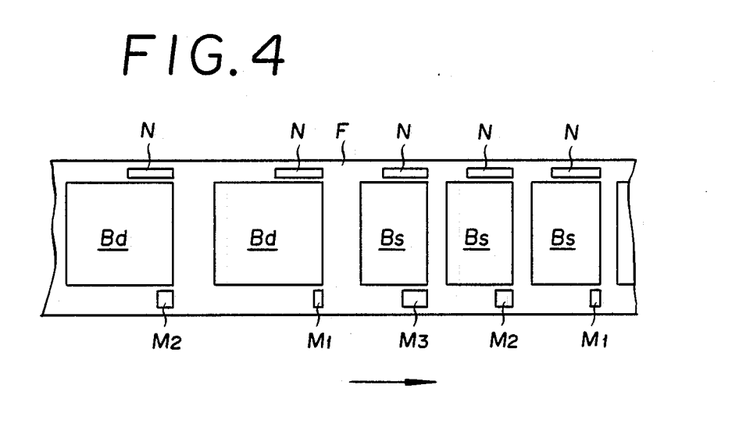
FIG. 4 is a plan view illustrating part of a microfilm on which original images and relevant images as information for retrieval have been photographed by the photographing apparatus of this invention.

FIG. 4 is a diagram illustrating part of a microfilm F on which original images and information for retrieval relevant thereto, namely document marks and frame numbers as additional information, are photographed by the microfilm camera of the present invention. In the diagram, the symbol Bd represents a recorded image of full size namely double size and the symbol Bs a recorded image of half size namely single size. The symbols M1 to M3 stand for document marks and the symbol N stands for a region in which a frame number is written. Preparatory to the photographing on this film F, the film F is conveyed in the direction indicated by the arrow.

Figure 3:
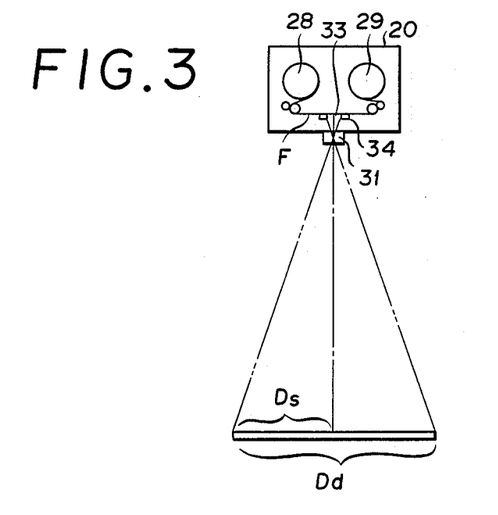
FIG. 3 is a front view illustrating the path for image receiving light from an original image on a document to the camera head while the document is changed from single size to double size.

As described above, the movable plate 35 illustrated in FIG. 2 is switched in accordance with the size of the document. In photographing an image recorded on a document Dd of double size, the movable plate 35 is switched to an open state as illustrated in FIG. 3. When this photographing is completed, the microfilm F is advanced by the rotation of the feed roller 41. The amount of this advance is the sum of the size of the recorded image Bd in the direction of conveyance and the space between the recorded images. When an image of a document Ds of single size is to be photographed after an image recorded on a document of double size has been photographed, the switching shaft 35a of the movable plate 35 is positioned this side in the direction of conveyance of the film F. When this movable plate 35 is closed, the leading end of the movable plate 35 coincides with the optical axis. Thus, the image Bs corresponding to the document Ds of single size can be photographed as juxtaposed to the image Bd of double size with the film held in its naturally conveyed state without being slid away.

Figure 5:
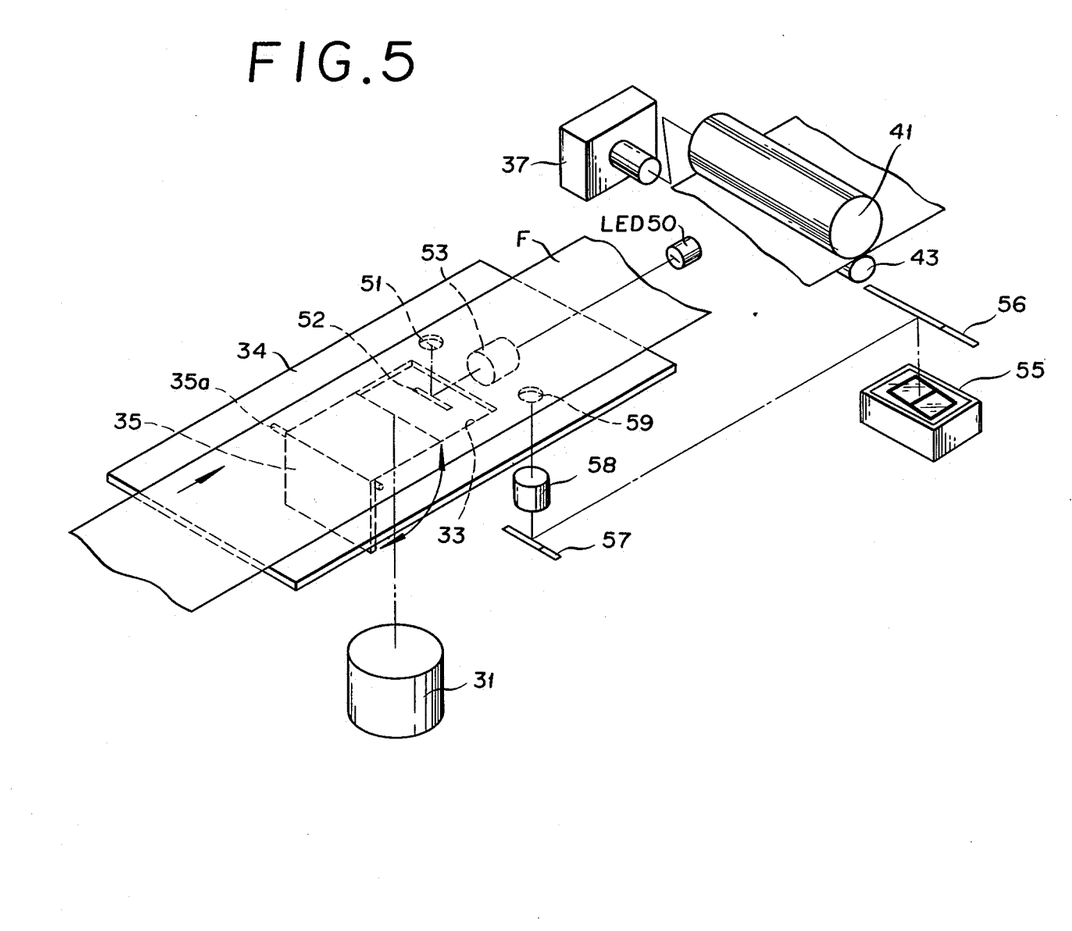
FIG. 5 is a perspective view illustrating schematically a retrieval information photographing part incorporated in the camera head of this invention.

FIG. 5 is a diagram illustrating a retrieval information photographing mechanism incorporated in the camera head 20 of the present invention. As illustrated, the camera head 20 is provided therein with a LED (light emitting diode) 50 for photographing document marks. This LED 50 is so adapted as to emit a slit light of a width smaller than the smallest of the widths possessed by document marks or blip marks of several types to be additionally photographed on the microfilm F. For the slip light to impinge on the lateral part in the direction of width of the film F, a light transmitting opening 51 is formed on the downstream side in the direction of conveyance of the film F relative to the aperture mentioned above. A lens 53 is disposed between a mirror 52 installed below the opening 51 and the LED 50 mentioned above.

For the frame number to be additionally photographed on the film in a part on the side opposite the direction of width of the film to the document mark, a number display device 55 is set in place inside the camera head 20. This display device forms 10 one-digit numerals 0 to 9 by varying a combination of seven segments such that the numeral "8" is formed when all of the seven segments are turned ON. The numeral of light is transmitted via mirrors 56 and 57 and a lens 58 and caused to impinge on the film F at the part of a light transmitting opening 59 formed in the stationary plate 34.

The photographing of the document mark on the microfilm F is accomplished by continuing the advance of the film F by the feed roller 41 and, at the same time, controlling the duration in which the LED 50 emits the slit light smaller than the smallest of all of the widths of document marks M1. The photographing of the frame number on the microfilm F is attained by causing a one-digit numeral, namely a numeral of the least significant digit, from the display device 55 capable of emitting light in the pattern of a numeral to impinge on the microfilm F, then advancing the film F in a prescribed stroke with the feed roller 41, and bringing the film F to a stop and causing the numeral of the next higher digit to impinge on the film F. By alternately repeating the exposure of the film at rest to a numeral and the advance of the film F in the prescribed stroke, a numeral of a prescribed number of digits such as, for example, 12 digits, is photographed as information for retrieval on the film F. This procedure of photographing is carried out after the relevant original image recorded on the document has been photographed on the film F and the film has been then advance in the prescribed stroke.

Theoretically, it is permissible to carry out the photographing of the information for retrieval before the relevant original image has been effected.

Figure 6:
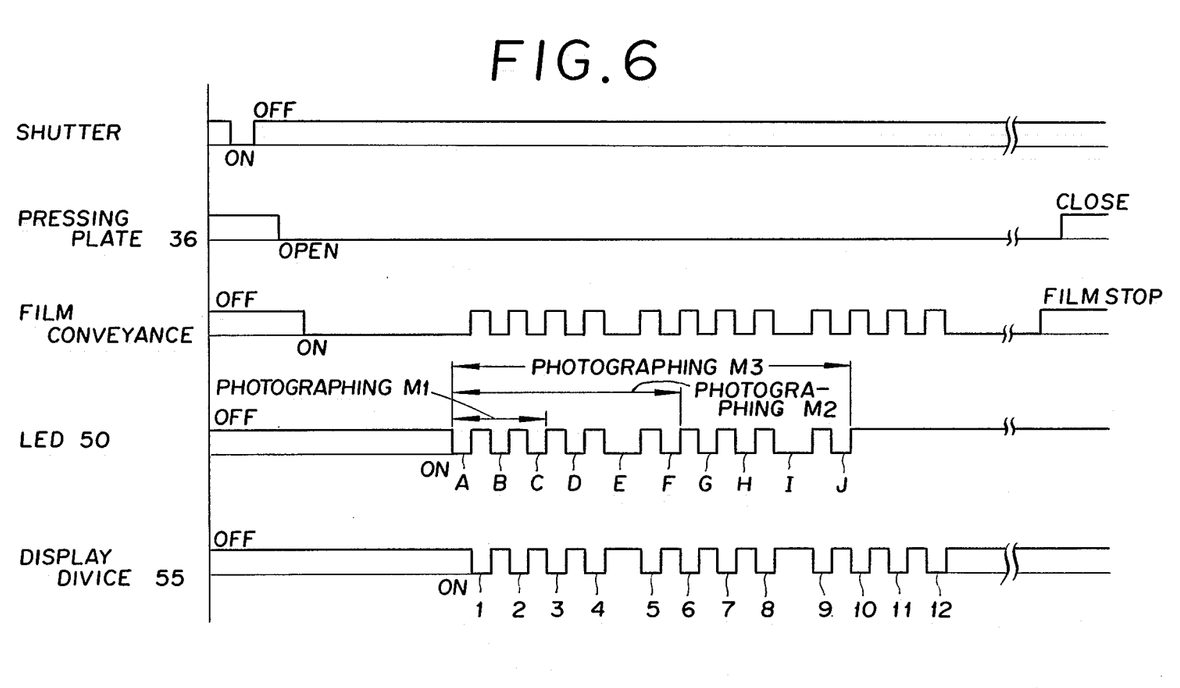
FIG. 6 is a time chart illustrating the procedure of photographing information for retrieval.

FIG. 6 is a time chart illustrating the relation of timing between the advance of the film F and the exposure of the film to the LED 50 and the display device 55. The photographing of the recorded original image on the film F is accomplished by keeping the pressing plate 36 pressed fast against the film F and giving a shuttering motion to a shutter (not shown) incorporated in the camera head 20. In this while, the feed roller 41 is at rest and the film F, therefore, is not advanced.

After the photographing of the original image carried out as described above has been completed, the first exposure A to the light from the LED 50 is effected. when the leading end of the recorded original image photographed on the film F is brought to the position of openings 51, 59. During this time, the advance of the film F is continued. After the completion of the first exposure A, the LED 50 is turned OFF and, at the same time, the advance of the film F is stopped and the pertinent one-digit numeral is lit up with the display device 55 at the timing of "1". When the emission of light from the LED 50 during the advance of the film F is made three times as indicated by the symbols A to C, the document mark M1 of the smallest width illustrated in FIG. 4 is photographed in a width proportionate to the total distance of advance of the film during the time of exposure. In this while, the film F makes two stops. Between the two stops, two-digit numerals are photographed one each at the portions indicated by the symbols "1" and "2."

When the document mark to be photographed on the film F is of the smallest width, the LED 50 is no longer lit up. When the document mark M2 of a medial width illustrated in FIG. 4 is to be photographed, the film is further advanced and the LED 50 is lit up also at the times indicated by the symbols D to F in FIG. 7. Similarly the document mark M3 of the largest width is photographed by further causing the LED 50 to be lit up during the advance of the film F additionally at the times indicated by the symbols G to J.

A numeral of a total of 12 digits is photographed as information for retrieval in a frame number writing part N on the film F indicated in FIG. 4 by causing the prescribed numeral to be projected with the display device 55 while the film is alternately advanced and stopped in a state represented by the simbols "1" to "12" in FIG. 6. In this case, the distance between the numerals photographed at the positions of "4" and "5" and the distance between the numerals photographed at the positions of "8" and "9" are larger than the distance between the other numerals and a frame number N composed of three blocks each of four digits is photographed.

The LED 50 is turned OFF while the display device 55 is turned ON. This relation is important because the time used in lighting the display device 55 for photographing the frame number N is longer than the time used in photographing the document mark and because the LED 50 produces the document mark in uneven density when the frame number and the document mark as the information for retrieval are simultaneously photographed. The simultaneous photographing can be materialied when the occurrence of the uneven density in the document mark is precluded.

The photographing width of the document mark is fixed by the distance or time of the advance of the film while the LED 50 is lit ON and the size between the individual numerals of the frame number is fixed by the distance or time of the conveyance of the film. The conveyance of the microfilm F in a state nipped between the feed roller 41 and the guide roller 43, therefore, must be carried out with high accuracy.

Figure 7:
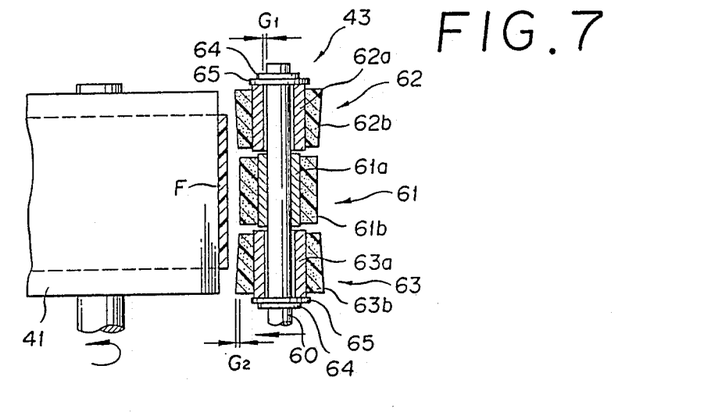
FIG. 7 is a cross section illustrating in detail the guide roller shown in FIG. 2.

The guide roller 43 incorporated in the camera head of the present invention, therefore, is constructed as illustrated in FIG. 7. Now, the guide roller 43 will be described below.

A supporting shaft 60 is fixed with an arm (not shown) and enabled by this arm to be moved toward or away from the feed roller 41. In the central part of this supporting shaft 60, a central roller 61 is rotatably inserted. At the opposite ends of the central roller 61, terminal roller 62, 63 are rotatably fitted around the terminals of the supporting shaft 60. These three rollers, 61 to 63, jointly form the guide roller 43 of this invention. The central roller 61 is composed of a metallic collar 61a rotatably fitted to the supporting shaft 60 and a rubber roller portion 61b adapted to be pressed against the central part in the direction of width of the microfilm F when the supporting shaft 60 fixed to the outer side of the collar 61a is approximated toward the feed roller 41. The inside diameter of the collar 61a is substantially identical with the outside diameter of the supporting shaft 60 so that the collar 61a is allowed to be freely rotated around the supporting shaft 60 without producing any play against the supporting shaft 60.

The terminal roller 62 is composed of a metallic collar 62a formed with an inside diameter larger than the outside diameter of the supporting shaft 60 and therefore allowed to be fitted around the supporting shaft 60 and a rubber roller portion 62b fixed to the outer side cf the collar 62a and adapted so as to be pressed against one of the lateral sides of the microfilm F when the supporting shaft 60 is approximated toward the feed roller 41. Similarly, the other terminal roller 63 is composed of a collar 63a possessed of an inside diameter substantially identical with that of the collar 62a and a rubber roller portion 63b adapted to be pressed against the other terminal of the microfilm F. These terminal rollers 62, 63 have a diverging peripheral surface so that the outside diameter thereof is larger on the terminal side of the axial direction on the central side of the axial direction. As the result, the outer peripheral surfaces of the two terminal rollers 62, 63 are inclined relative to the center of rotation of the feed roller 41.

The maximum size of the play G1 set between the collars 62a, 63a of the terminal rollers 62, 63 and the difference G2 between the maximum and minimum diameters of the terminal rollers 62, 63 are fixed below the thickness of the film in the illustrated embodiment. These values are fixed to balance mutually, with due consideration paid to such factors as hardness of rubber.

To prevent the end faces of the three rollers 61, 62, and 63 from coming into direct contact, the lengths of these roll portions in the axial direction are smaller than those of the respective collars 61a to 63a. The overall length of the guide roller 43 which is formed jointly of the three rollers 61 to 63 is substantially equal to the length of the feed roller 41 which is larger than the width of the film F.

Two E rings 64 are held in fast engagement with the supporting shaft 60 so as to prevent the feed roller 61 from slipping off the supporting shaft 60. Washers 65 are interposed on each between the E rings 64 and the collars 62a, 63a.

The opposite lateral edges of the portion of the microfilm F which is passed over the feed roller 41 tend to curl in the direction of departing from the feed roller 41. When the supporting shaft 60 is moved toward the feed roller 41, the central roller 61 is pressed against the central part of the film F. The terminal rollers 62, 63 infallibly press the opposite lateral edges of the microfilm F because their outer peripheral surfaces are inclined relative to the central axis of the feed roller 41. As the result, the oposite lateral edges of the film F are strongly pressed to give rise to a tension exerted upon the film F in the outward direction from the center in the direction of width of the film F. The film F, therefore, is nipped throughout the entire width thereof between the feed roller 41 and the guide roller 43. Even in the case of a film F having a large thickness and exhibiting strong nerve, the inclined outer peripheral surfaces will exert tensile strength tending outwardly upon the opposite lateral edges of the film, with the result that the film F is strongly pressed against the metallic feed roller 41.

The terminal rollers 62, 63 are endowed with the gap smaller than the thickness of the film F. These terminal rollers 62, 63, while following the rotation of the feed roller 41 and keeping the respective outer peripheral surfaces thereof pressed against the film, avoid interfering with the state of fast contact with the central roller 61 and ensure fast contact of the outer peripheral surfaces of the terminal rollers 62, 63 against the opposite lateral edges in the direction of width of the film F. The film F, therefore, is liberated from the effect of the curling trend inherent therein and allowed to come into uniform contact with the feed roller 41 throughout the entire direction of width. The impartation of the play G1 mentioned above may be omitted, depending on such factors as the hardness of rubber used as the raw material for the roller portions 62b, 63b of the terminal rollers 62, 63.

In the illustrated embodiment, the guide roller 43 is depicted as composed of three rollers. Optionally, the guide roller 43 may be composed of more than four rollers as by using two central rollers. The central roller 61 is depicted as rotatably attached to the supporting shaft 60. Optionally, it may be fixed to the supporting shaft 60. In this case, however, the supporting shaft 60 must be attached to the arm in such a manner that it will rotate in conjunction with the central roll 61.

The two opposite rollers 62, 63 have their outer peripheral surfaces converged so that the outer peripheral surfaces will be inclined relative to the central axis of rotation of the feed roller 41. When the opposite, terminal ends of the supporting shaft 60 are bent relative to the central part with angles equalling those of convergence, the opposite terminal roller 62 and 63 may be formed with rollers which have no converged outer periphearl surfaces similarly to the central roller 61.

Figure 8:
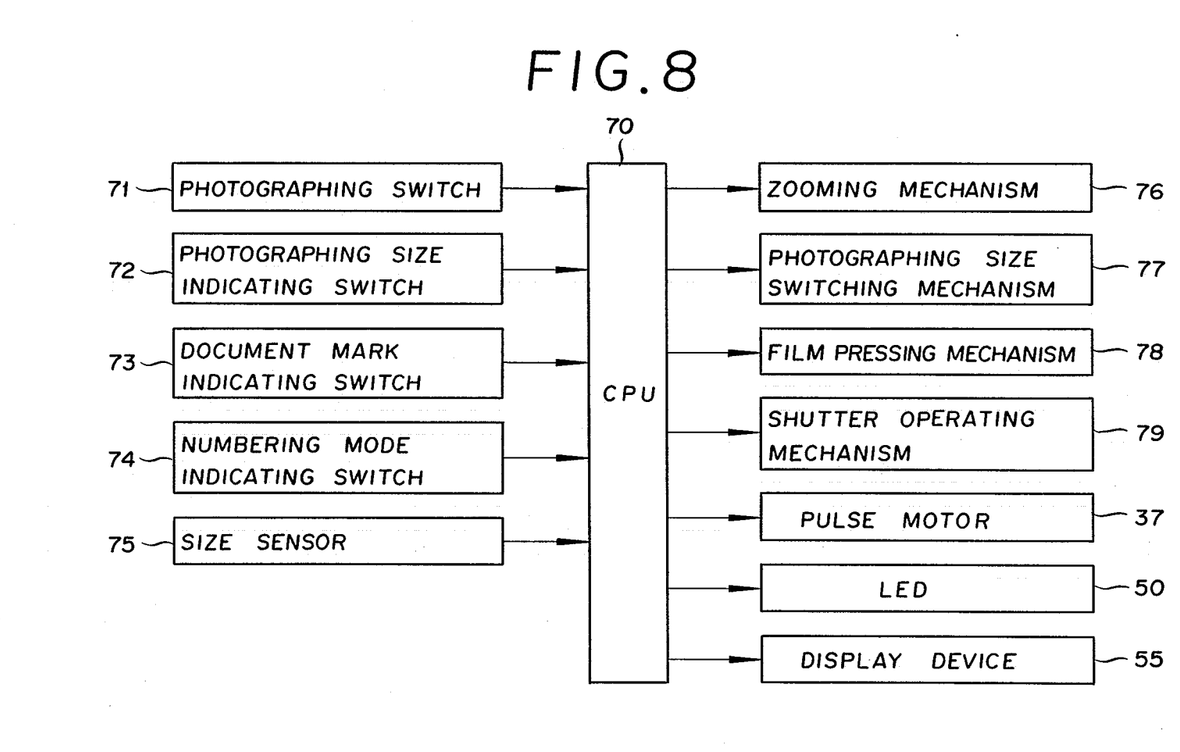
FIG. 8 is a block diagram illustrating a control circuit for controlling the operation of the photographing apparatus of this invention.

FIG. 8 is a diagram illustrating a control circuit for controlling the operation of the microfilm camera of the present invention. To a CPU 70, a photographing switch 71 for starting the photographing of an original image on the microfilm F and a photographing size indicating switch 72 for injecting data as to whether the document to be photographed is in single size or double size are connected. Further, a document mark indicating switch 73 for injecting data as to the choice among the three widths of document mark and the discrimination between the presence and absence of use of any mark to be photographed and a numbering mode indicating switch 74 for designating the number of digits of the numeral to be photographed, designating the number of digits of each of the component blocks of the numeral such as, for example, "2-3" for "12 345" or "3-2" for "123 45," or indicating the absence of the numeral of this sort to be photographed are connected to the CPU 70. The photographing switch 71, the photographing size indicating switch 72, the document mark indicating switch 73, and the numeral mode indicating switch 74 are disposed on operation panels 19a, 19b illustrated in FIG. 1 and the signals introduced through these switches are transmitted to the CPU 70.

As already described, the base table 10 as a document stand incorporates therein a document conveying device. The transfer part (not shown) for guiding document sheets forwarded by the document conveying device incorporated therein a size sensor 75. The signal from this sensor 75 is transmitted to the CPU 70.

As illustrated in FIG. 1, the camera head 20 is adapted to be moved vertically in conjunction with the holder 18 in order that an original image on a document supported on the document base table 10 may be photographed in a prescribed ratio of reduction proportionate to the size of the document. This vertical movement is produced by a zooming mechanism 76 illustrated in FIG. 8. To this zooming mechanism 76, the CPU issues a control signal. As illustrated in FIG. 2 and FIG. 5, the movable plate 35 produces a switching movement about the axis 35a so as to vary the area of the opening of the aperture 33 formed in the stationary plate 34 in accordance with the size of the document. To perform this switching of the movable plate 35, a photographing size switching mehcanism 77 illustated in FIG. 8 is incorporated in the camera head 20. This photographing size switching mechanism 77 is adapted to be operated in accordance with the control signal to be issued from the CPU 70.

Further, a film pressing mechanism 78 serving to keep the film F pressed against the stationary plate 34 while the pressing plate 36 illustrated in FIG. 2 is operated during the photographing of the original image is incorporated in the camera head 20. The control of this film pressing mechanism 78 is effected in accordance with the control signal issued from the CPU 70. In the photographing of the original image of the document, the time for keeping the shutter open must be controlled proportionately to the illuminance the original image on the document base table 10. For the purpose of this control, an AE sensor for discerning the amount of light to be received is installed at a suitable position as in the camera head 20. The signal from the AE sensor is forwarded via the CPU 70 to a photographing shutter operating mechanism 70, there to be used for controlling the shutter speed.

The control of rotation of the pulse motor 37 serving to drive the feed roller 41 and convey the film F, the control of switch of the LED 50 for the photographing of the document mark, and the control of setting and lighting of the numeral by the display device 55 for the photographing of the frame number are carried out by the CPU 70.

Figure 9:
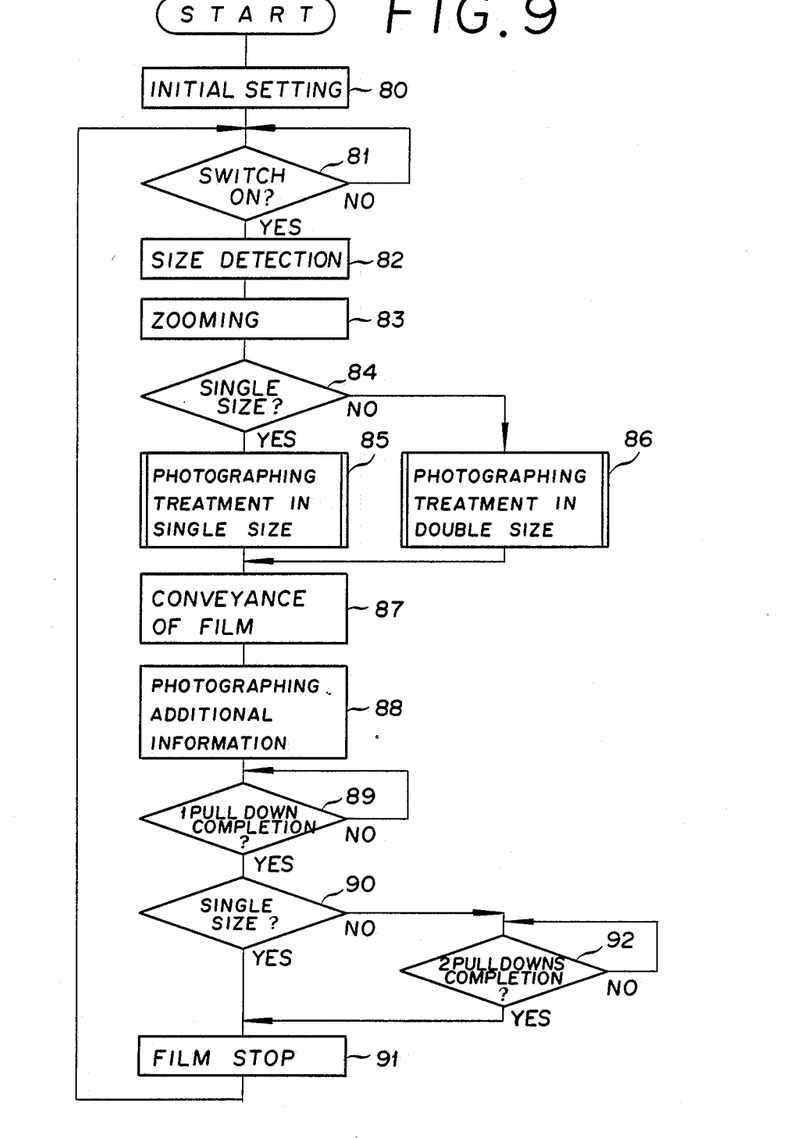
FIG. 9 is a flow chart illustrating a typical control to be effected in the present invention.

FIG. 9 is a flow chart illustrating the procedure for working this invention. Now, the procedure of the operation of the microfilm camera of the present invention will be described below. At the same time that the operation of the microfilm camera is started, the initial setting of the control device is effected at the step 80. When the photographing switch 71 is found to be in the ON state at the step 81, the size of the document is detected in the next step 82. This detection is made by the size sensor 75 incorporated in the document conveying device before the document is forwarded to the prescribed position. When the size of the document is detected as described above, the suitable ratio of reduction is calculated from the size so detected, with the result that the control signal is forwarded via the CPU 70 to the zooming mechanism 76. As the result, the camera head 20 and the holder 18 are vertically moved to effect the required zooming at the suitable ratio of reduction at the step 83.

When the document is found to be in the single size (YES) at the step 84, the photographing treatment in the single size is carried out at the step 85. When the document is found to be in the double size, the photographing treatment in the double size is carried out at the step 86. In either of these steps, the original image recorded in the document is photographed on the microfilm F.

After the original image is photographed on the film F, the conveyance of the film F is started at the step 87. When the portion of the film F corresponding to the leading end of the original image photographed in the preceding step reaches the position of the openings 51, 59 illustrated in FIG. 5, the treatment for the photographing of information for retrieval is carried out at the step 88. In this step, the film F is conveyed intermittently and, at the same time, the document mark or the blip mark is additionally photographed by the LED 50 and the frame number is additionally photographed by the display device 55 as depicted by the time chart of FIG. 6.

Of the information for retrieval, the document mark is photographed by causing the LED 50 capable of emitting a slit light of the smallest unit width smaller than the width of the document mark, M1, having the smallest of all document mark widths to remain glowing while the film F is being conveyed. By controlling the duration of the glowing time of the LED 50 or the distance of the conveyance of the film F while the LED 50 is kept in the ON state, the LED 50 which is used solely is enabled to photograph additionally a document mark in any mark such as is selected from the three different widths assigned to the document marks, M1 to M3, on the film F. Of the information for retrieval, the frame number is photographed additionally on the film F by causing the display device 55 capable of displaying a numeral of the smallest unit width, namely, a one-digit numeral, to project light in the pattern of the one-digit numeral on the film F while the film is at rest, then advancing the film F in a prescribed distance while the display device 55 is kept in the OFF state, thereafter causing the display device 55 again to project light in the pattern of next digit, and repeating this procedure a number of times required in completing a given numeral as the frame number. By alternately repeating the photographing of a numural during the stop of the film and the advance of the film during the rest of the display device 55 for an interval required for insertion of distance between adjacent numerals, the display device 55 which is used solely is enabled to photograph additionally a numeral of a desired number of digits on the film F.

The photographing of the information for retrieval is effected within a range which covers information for original image corresponding to the relevant document in the single size. It follows from this statement that the photographing of information for retrieval is completed without reference to the discrimination between the single size and the double size when the film F is advanced by a distance equivalent to the width of the information for an original image to be photographed in the single size.

When the information of original image to be photographed is in the single size, the distance of advance of the film F in preparation for the photographing of the next information of original image, namely one pulldown, is set by the number of pulses to be supplied to the pulse motor 37. The decision as to whether or not the advance of the film F by one pulldown has been completed is made by the fact that the number of pulses supplied by the pulse motor 37 has reached the prescribed total at the step 89. The decision as to whether the information of original image already photographed incombination with the information for retrieval is in the single size or in the double size or otherwise is made at the step 90. When the already photographed information of original image is found to be in the single size (YES) at this step 90, the conveyance of the film F is stopped at the step 91.

When the photographed original image is found to be in the double size at the step 90, the conveyance of the film F is continued until the distance of conveyance of the film F equals the width of the original image of double size, namely the conveyance by two pulldowns is completed. When the completion of this conveyance is confirmed at the step 92, the conveyance of the film F is stopped. In the manner described above, the work of photographing the original image from the next document and the relevant information for retrieval on the film F is repeated.

The photographing of the frame number has been depicted as attained by the use of the display device 55 capable of emitting light in the pattern of a numeral in ten kinds, 0 to 9. Optionally, a display device capable of emitting light in the pattern of an alphabetic letter may be used in the place of or in combination with the display device 55. As the information for retrieval to be additionally photographed, other sorts of information such as date and image size may be used besides the document mark and the frame number described above.

In the illustrated embodiment, the photographing of the frame number has been depicted as accomplished by alternately repeating the advance and stop of the microfilm F and keeping the display device in the ON state while the microfilm F is at rest. Optionally, the photographing of the document mark may be carried out while the microfilm F is at rest.

Further, the illustrated embodiment has been portrayed as having both the frame number and the document mark additionally photographed. Optionally, this additional photographing may be limited to either of these two items of the information for retrieval. When the document mark alone is selected for the additional photographing, the microfilm F need not be conveyed intermittently but may be conveyed continuously.

Further, the illustrated embodiment has been portrayed as causing the LED 50 to be turned ON and OFF for the photographing of the document mark. Optionally, a light-shielding member may be interposed between the LED 50 and the microfilm F, switching from presence to the absence of the light-shielded state by the use of this member, and allowing the document mark to be photographed in a desired length on the microfilm.

What is claimed is:

1. A micro-image photographing camera for photographing original images and additional information on a film, which comprises:
   photographing means for photographing an original image on the film;
   additional image generating means including a light source and optical means for projecting light from said light source on the film;
   transporting means for transporting the film; and
   control means for controlling the operating period of said optical means during the transportation of the film by the transporting means thereby allowing the formation of the additional information of a varying size on the film.

2. A micro-image photographing camera according to claim 1, wherein said controlling means adjusts the period of emission of the light from said light source.

3. A micro-image photographing camera according to claim 1, wherein said additional image includes a blip mark for aiding in the retrieval of a relevant image photographed on the film.

4. A micro-image photographing camera for photographing original images and additional information on a film, which comprises:
   photographing means for photographing an original image on the film;
   additional information generating means including a light source and optical means for projecting light from said light source on the film;
   transporting means for transporting said film;
   shielding means interposed between said light source and said film and adapted to intercept the light emitted from said light source toward said film; and
   controlling means for retracting said shielding means from between said light source and said film and controlling the period of projection of light by said additional information generating means to said film thereby allowing the formation of the additional information of a varying size on the film.

5. A micro-image photographing camera for photographing original images and additional information on a film, which comprises:
   photographing means for photographing an original image on the film;
   displaying means for dividing the additional information corresponding to each original image into a plurality of parts and successively displaying each part of the additional information;
   projecting means for projecting the displayed part of the additional information onto the film; and
   transporting means for intermittently transporting the film synchronously with the projection of the displayed part of the additional information.

6. A micro-image photographing camera for photographing original images and additional information including a plurality of parts, which comprises:
   photographing means for photographing an original image on the film;
   displaying means for successively displaying said plurality of parts of the additional information;
   projecting means for projecting the additional information displayed on said displaying means, and
   transporting means for intermittently transporting the film synchronously with the projection of the displayed additional information, wherein said displaying means displays a one-digit numeral.

7. A micro-image photographing camera for photographing original images and additional information including a plurality of parts, which comprises:
   photographing means for photographing an original image on the film;
   displaying means for successively displaying said plurality of parts of the additional information;
   projecting means for projecting the additional information displayed on said displaying means, and
   transporting means for intermittently transporting the film synchronously with the projection of the displayed additional information, wherein said displaying means is keep ON to display a numeral while said microfilm is at rest and is kept OFF while said microfilm is being conveyed.

8. A micro-image photographing camera for photographing original images, first additional information and second additional information, which comprises:
   photographing means for photographing an original image on the film;
   transporting means for intermittently transporting the film;
   first information means comprising a light source, first projecting means for projecting light from said light source on a part of the film, and first controlling means for controlling the projecting period of said projecting means while the transporting means is ON and inhibiting the projection of light from said light source while the transporting means is OFF, thereby enabling said first information means to photograph the first additional information in various sizes on the film; and
   second information means comprising displaying means for optically displaying the second additional information, second projecting means for projecting the second additional information on the film, and second controlling means for causing said displaying means to display successively a plurality of parts of the second additional information synchronously with the suspension of the operation of the transporting means and inhibiting the projection of the second projecting means while the transporting means is ON, thereby enabling the second information means to photograph the second additional information on the film.

9. A micro-image photographing camera according to claim 8, wherein said first projecting means issues a slit light and consequently forms a blip mark on said film.

10. A micro-image photographing camera according to claim 8, wherein said displaying means displays a one-digit-numeral and consequently form a frame number on said film.

11. A method for photographing a micro-image and an additional image on a film, comprising the steps of:
    photographing an original image on the film;
    projecting light from a light source on the film;
    transporting the film while the light source is emitting light; and
    controlling the period of emission of light from said light source during the transportation of the film thereby allowing the formation of the additional information in various sizes on the film.

12. A method for photographing a micro-image and an additional image on a film, comprising the steps of:
    photographing an original image on the film;
    successively displaying a plurality of parts of the additional information on a displaying means;

projecting the additional information displayed on said displaying means; and intermittently transporting the film synchronously with the projection of the additional information thereby photographing the additional information on the film.

13. A micro-image photographing camera for photographing original images and additional information on a film, which comprises: photographing means for photographing an original image on the film;

projecting means for projecting light on the film;

transporting means for transporting the film;

shielding means operable to intercept the light from said projecting means toward the film, and control means for controlling said shielding means so that the light from said projecting means reaches the film in a predetermined variable time period while the film is being transported, thereby allowing the formation of additional information of a predetermined variable size on the film.

* * * * *